(12) United States Patent
Keith et al.

(10) Patent No.: US 7,130,242 B1
(45) Date of Patent: Oct. 31, 2006

(54) SYSTEM AND METHOD FOR DETECTING AN ACOUSTIC SIGNAL IN THE PRESENCE OF FLOW NOISE

(75) Inventors: William L. Keith, Ashaway, RI (US); Kimberly M. Cipolla, Portsmouth, RI (US); Michael R. Williams, Richmond, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/185,087

(22) Filed: Jul. 15, 2005

(51) Int. Cl.
*G01V 1/38* (2006.01)

(52) U.S. Cl. .......................... 367/20; 367/21; 367/154

(58) Field of Classification Search ................. 367/20, 367/21, 154
See application file for complete search history.

(56) References Cited

U.S. PATENT DOCUMENTS

| | | | |
|---|---|---|---|
| 3,860,899 A * | 1/1975 | Watlington | ................. 367/154 |
| 4,388,711 A | 6/1983 | Fay | |
| 4,984,218 A | 1/1991 | Ritter et al. | |
| 5,251,183 A | 10/1993 | McConnell et al. | |
| 5,528,555 A | 6/1996 | Santos et al. | |
| 6,058,072 A | 5/2000 | Abraham | |
| 6,185,154 B1 | 2/2001 | Miller | |
| 6,473,365 B1 * | 10/2002 | Joh et al. | ....................... 367/20 |

\* cited by examiner

*Primary Examiner*—Ian J. Lobo
(74) *Attorney, Agent, or Firm*—Jean-Paul A. Nasser; James M. Kasischke; Michael P. Stanley

(57) ABSTRACT

A system and method are provided for detecting an acoustic signal in the presence of flow noise produced by the turbulent flow field that develops about a hosewall of a towed array. Pressure is sensed with pressure sensors at two diametrically-opposed locations at the surface of the hosewall over a period of time. The sensed pressure signals are used to generate an ensemble-averaged cross-spectra which effectively cancels out the flow noise while retaining the acoustic signal associated with a possible target of interest.

9 Claims, 1 Drawing Sheet

SYSTEM AND METHOD FOR DETECTING AN ACOUSTIC SIGNAL IN THE PRESENCE OF FLOW NOISE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to acoustic signal detection in the presence of flow noise, and more particularly to a system and method for detecting an acoustic signal in the presence of flow noise produced by the turbulent flow field that develops about a hosewall of a towed array being towed through the water.

(2) Description of the Prior Art

Currently, towed arrays have a limited tow speed range over which they can operate effectively because of flow noise. Flow noise, which can mask an acoustic signal of interest, is generally divided into direct noise from the predominantly non-acoustic turbulent boundary layer wall pressure fluctuations and flow induced noise due to structural vibrations excited by the turbulent boundary layer. Existing towed array systems designed to mitigate against or reduce direct flow noise effects are currently only effective over a specific towing speed and frequency range. However, turbulent wall pressure fluctuations resulting from the turbulent boundary layer exist over the entire array at all operating speeds.

SUMMARY OF THE INVENTION

Accordingly, it is an object of the present invention to provide a system and method for detecting an acoustic signal in the presence of flow noise caused by the turbulent boundary layer of a towed array.

Another object of the present invention is to provide a system and method that can detect an acoustic signal in the presence of flow noise over the entire range of tow speeds of a towed array.

Other objects and advantages of the present invention will become more obvious hereinafter in the specification and drawings.

In accordance with the present invention, a system and method are provided for detecting an acoustic signal in the presence of flow noise produced by the turbulent flow field that develops about a hosewall of a towed array as the array is towed through the water. Pressure is sensed with pressure sensors at two diametrically-opposed locations at the surface of the hosewall over a period of time. The sensed pressure signals are used to generate an ensemble-averaged cross-spectra which effectively cancels out the flow noise portion of the signal while retaining the acoustic portion of the signal.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
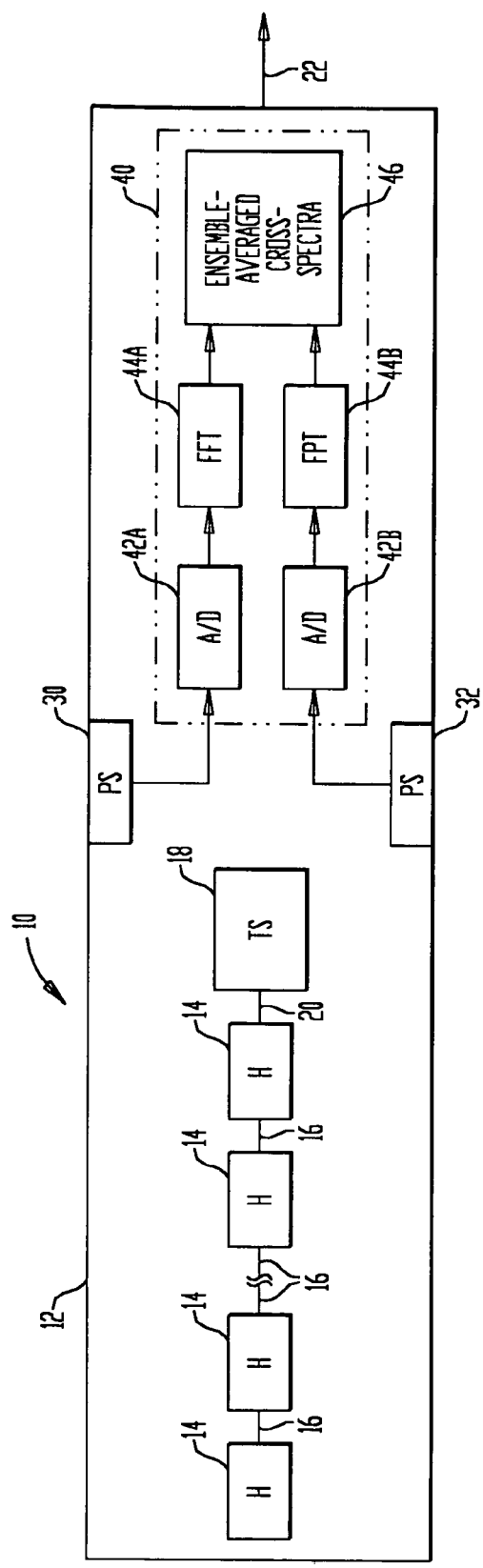
FIG. 1 is a schematic view of a system for detecting an acoustic signal in the presence of flow noise in the turbulent boundary layer of a towed array in accordance with the present invention.

Referring now to the drawings, and more particularly to FIG. 1, a conventional towed array assembly 10 includes an outer hose 12, a plurality of hydrophones ("H") 14 arrayed along a central portion of hose 12 and electrically coupled to one another via signal lines 16, and a telemetry system ("TS") 18 coupled to hydrophones 14 via a signal line 20. Towed array assembly 10 is towed through the water in the direction of (for example) arrow 22. As is well understood in the art, as towed array assembly 10 is towed through the water, each of hydrophones 14 circumferentially averages pressures sensed thereby. The sensed pressures are propagated along signal lines 16 and 20 to telemetry system 18 which, in turn, relays the sensed pressures to an end user or system (not shown) that is typically located onboard the towing vessel (not shown).

As mentioned above and as is well known in the art, a turbulent flow field (or turbulent boundary layer as it is known) develops about hose 12 as towed array assembly 10 moves through the water. This turbulent boundary layer causes turbulent wall pressure fluctuations at the entire surface of hose 12 for all tow speeds. The turbulence length scales corresponding to the wall pressure fluctuations are typically very small and have very short correlation or spatial coherence lengths. In particular, these turbulence length scales are much smaller than acoustic wavelengths at low to moderate frequencies. The system and method of the present invention exploit these properties to detect the presence of an acoustic signal of interest in the presence of flow noise.

Figure 2:
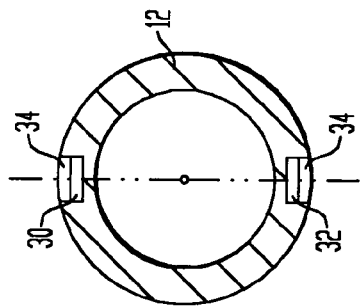
FIG. 2 is a cross-sectional view of the towed array's hosewall with the pair of pressure sensors mounted therein in accordance with the present invention.

In accordance with the present invention, towed array assembly 10 can be modified as follows to provide for acoustic signal detection in the presence of flow noise. Pressure sensors ("PS") 30 and 32 are used to sense pressure fluctuations over a period of time at the surface of hose 12. More specifically, fluctuating pressure is sensed at two diametrically-opposed locations on the surface of hose 12. For clarity of illustration, pressure sensors 30 and 32 are located forward of hydrophones 14 and telemetry system 18. However, pressure sensors 30 and 32 can be located anywhere along the length of hose 12 without departing from the scope of the present invention. Additional pairs of diametrically-opposed pressure sensors could also be used. By way of a non-limiting example, each of pressure sensors 30 and 32 could be a simple ceramic pressure sensor potted into the wall of hose 12 as best seen in FIG. 2. A thin film of an acoustic potting compound 34 can be used to cover and protect the surface of each of pressure sensors 30 and 32.

Fluctuating pressures sensed by each of pressure sensors 30 and 32 are processed by a processing system 40 that can be realized by a single processor or specialized processing elements without departing from the scope of the present invention. Further, although processing system 40 is illustrated as being within towed array assembly 10, the present invention is not so limited as some or all of the functions performed by processing system 40 could also be located at the end user location (e.g., onboard the towing vessel) that receives analog or digitized outputs from telemetry system 18. That is, pressure sensors 30 and 32 could have their analog outputs (or digitized outputs) coupled directly to telemetry system 18 with such outputs then being transmitted to the end user location for processing.

Regardless of where the functions of processing system 40 take place, the sensed pressures from sensors 30 and 32 are respectively digitized by analog-to-digital ("A/D") converters 42A and 42B. The respective digitized sequences are then converted into the frequency domain by respective fast Fourier Transforms ("FFT") 44A and 44B. The resulting FFTs are then processed to generate an ensemble-averaged cross-spectra 46. As is known in the art of frequency domain processing, an ensemble-averaged cross-spectra is generated by multiplying a first FFT (e.g., that generated by FFT 44A) times the complex conjugate of a second FFT (e.g., that generated by FFT 44B). The frequency range and sampling rate of telemetry system 18 can be used to define the frequency range and sampling rate for performing ensemble-averaged cross-spectra 46.

As mentioned above, conventional array hydrophones located in the center of the array circumferentially average the incoming pressure signal. In the case where an acoustic array (e.g., the array defined by hydrophones 14) is flow noise limited, the direct flow noise component due to the turbulent boundary layer at a given frequency masks the acoustic signal of interest. The present invention makes use of the fact that the coherence or correlation between two sensors (e.g., sensors 30 and 32) diametrically-opposed in the array assembly's hose is approximately zero when time averaged. As a result, when sensors 30 and 32 are exposed to an acoustic signal of interest, the cross-spectra between the diametrically-opposed sensors will effectively cancel out the flow noise portion of the signal while retaining the acoustic portion of the signal. Thus, the cross-spectra generated from the output of pressure sensors 30 and 32 can be used to detect the presence of an acoustic signal at a given frequency even when the array defined by hydrophones 14 is flow noise limited. Such detection could be used to alert the towed array assembly's operator to the presence of a possible target of interest. Further, a detection by the present invention could also be used to indicate that special processing techniques may have to be applied to the output of hydrophones 14 in order for their measurements to be effective for target localization and/or classification.

The advantages of the present invention are numerous. The present invention is applicable to single and multi-line towed arrays. The pressure sensors can simply be integrated into a towed array's hosewall. These sensors are very small, inexpensive, and lightweight, and would be compatible with existing towed array telemetry. The two sensors are at the same axial or streamwise location, and will measure the identical acoustic field from sources over frequency ranges generally of interest. In other words, the measured acoustic field is perfectly correlated, and the flow noise from the turbulent boundary layer is highly uncorrelated in the transverse or spanwise direction.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for detecting an acoustic signal in the presence of flow noise produced by the turbulent flow field that develops about a hosewall of a towed array being towed through the water, said system comprising:

sensing means for sensing pressure at two diametrically-opposed locations at the surface of the hosewall over a period of time; and processing means coupled to said sensing means for generating an ensemble-averaged cross-spectra using said pressure so-sensed over the period of time.

2. A system as in claim 1 wherein said sensing means comprises a pair of pressure sensors potted in the hosewall with each of said pair being located at one of said two diametrically-opposed locations.

3. A system as in claim 2 wherein said pressure sensors comprise ceramic pressure sensors.

4. A system as in claim 1 wherein said processing means comprises:

means for digitizing said pressure so-sensed over the period of time at each of said two diametrically-opposed locations, wherein a corresponding pair of digitized sequences of pressure measurements are generated;

means for performing a Fast Fourier Transform (FFT) on each of said pair of digitized sequences wherein a corresponding pair of FFTs are generated; and means for generating said ensemble-averaged cross-spectra using said corresponding pair of FFTs.

5. A system for detecting an acoustic signal in the presence of flow noise produced by the turbulent flow field that develops about a hosewall of a towed array being towed through the water, said system comprising:

a first pressure sensor mounted in the hosewall for measuring pressure fluctuations at a surface of the hosewall at a first location thereon;

a second pressure sensor mounted in the hosewall for measuring pressure fluctuations at the surface of the hosewall at a second location thereon, said first and second locations being diametrically-opposed to one another; and a processor coupled to said first and second pressure sensors for generating an ensemble-averaged cross-spectra using said pressure fluctuations at said first and second locations.

6. A system as in claim 5 wherein said first and second pressure sensors comprises ceramic pressure sensors.

7. A method of detecting an acoustic signal in the presence of flow noise produced by the turbulent flow field that develops about a hosewall of a towed array being towed through the water, said method comprising the steps of:

sensing pressure at two diametrically-opposed locations at the surface of the hosewall over a period of time; and generating an ensemble-averaged cross-spectra using said pressure so-sensed over the period of time.

8. A method according to claim 7 wherein the towed array includes (i) a plurality of sensing elements located along a central axis of the towed array, and (ii) a telemetry system coupled to said sensing elements for transmitting measurements made by said sensing elements to an end user thereof, wherein said step of generating includes the step of using characteristics of the telemetry system in generating said ensemble-averaged cross-spectra.

9. A method according to claim 8 wherein said characteristics include the frequency range and sampling rate of the telemetry system.

* * * * *